United States Patent
Soto et al.

(10) Patent No.: US 7,225,228 B2
(45) Date of Patent: May 29, 2007

(54) EFFICIENT BINARY CONTENT DISTRIBUTION USING PROPAGATING MESSAGES

(75) Inventors: Juan Carlos Soto, San Francisco, CA (US); James Clark, San Luis Obispo, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 815 days.

(21) Appl. No.: 10/394,798

(22) Filed: Mar. 21, 2003

(65) Prior Publication Data

US 2003/0182373 A1 Sep. 25, 2003

Related U.S. Application Data

(60) Provisional application No. 60/367,573, filed on Mar. 25, 2002.

(51) Int. Cl.
G06F 15/16 (2006.01)
(52) U.S. Cl. .................. 709/205; 709/201; 709/231
(58) Field of Classification Search ........ 709/204–205, 709/231, 201, 206; 714/758
See application file for complete search history.

(56) References Cited

U.S. PATENT DOCUMENTS

| | | | | |
|---|---|---|---|---|
| 5,937,160 A | * | 8/1999 | Davis et al. ............. | 709/203 |
| 6,151,621 A | * | 11/2000 | Colyer et al. ........... | 709/204 |
| 6,691,153 B1 | * | 2/2004 | Hanson et al. .......... | 709/204 |
| 6,802,038 B1 | * | 10/2004 | Yu ........................... | 714/758 |
| 2002/0138576 A1 | * | 9/2002 | Schleicher et al. ...... | 709/205 |
| 2004/0064568 A1 | * | 4/2004 | Arora et al. ............. | 709/228 |
| 2004/0199572 A1 | * | 10/2004 | Hunt et al. .............. | 709/201 |
| 2005/0086300 A1 | * | 4/2005 | Yeager et al. ........... | 709/204 |
| 2005/0198388 A1 | * | 9/2005 | Teodosiu et al. ........ | 709/245 |

* cited by examiner

*Primary Examiner*—Abdullahi Salad
(74) *Attorney, Agent, or Firm*—Gunnison, McKay & Hodgson, L.L.P.; Philip J. McKay

(57) ABSTRACT

A method and system allows any peer to efficiently distribute content to all other peers in a peer group using existing propagation mechanisms. According to the invention, binary contents are broadcast over existing propagation mechanisms such as propagation pipes using a generic capability that can be used by any application that wants to multicast binary contents. According to the invention, the binary contents are broken up into file blocks that are then sent over existing propagation mechanisms such as propagation pipes. According to the present invention, the receiving peers negotiate among themselves to make up any file blocks they may have missed from the original broadcast. When each peer has all the file blocks associated with a given parent file, they store the content.

3 Claims, 9 Drawing Sheets

EFFICIENT BINARY CONTENT DISTRIBUTION USING PROPAGATING MESSAGES

RELATED PROVISIONAL APPLICATION AND PRIOIRTY CLAIM

The present application is related to, and claims priority from, Provisional Patent Application No. 60/367,573 entitled "EFFICIENT BINARY CONTENT DISTRIBUTION USING PROPAGATING MESSAGES", filed Mar. 25, 2002.

BACKGROUND OF THE INVENTION

Distributing binary content efficiently to many peers in a dynamic peer-to-peer network is a significant challenge. What is needed is a method and system that allows any peer to efficiently distribute content to all other peers in a peer group using existing propagation mechanisms.

SUMMARY OF THE INVENTION

The present invention is a method and system that allows any peer to efficiently distribute content to all other peers in a peer group using existing propagation mechanisms.

According to the present invention, binary contents are broadcast over existing propagation mechanisms, such as propagation pipes, using a generic capability that can be used by any application that wants to multicast binary contents. According to the present invention, the binary contents are broken up into file blocks that are then sent over existing propagation mechanisms. According to the present invention, the receiving peers negotiate among themselves to make up any file blocks they may have missed from the original broadcast. When each peer has all the file blocks associated with a given parent file, they store the content.

In one embodiment of the invention, the peer-to-peer network supports a "propagation" type of message transmission mechanism. In a "propagation" type of message transmission mechanism a message sent by one peer is delivered or "propagated", to all peers within the desired set of peers. As discussed below, in one embodiment of the invention, portions of the method of the invention also include a unicast "back channel" message transmission mechanism, whereby a message may be sent directly from one peer to another. In one embodiment of the invention, messages support the ability to set multiple message "elements", consisting of name and value pairs.

According to the present invention, the method or "protocol" of the invention is completely asynchronous, that is to say, the method of the invention supports the simultaneous sending and receiving of multiple files and messages do not need to be received in the same order as they are sent. Of course, some messages may be dropped in transmission, and not received by one or more peers. However, according to the present invention, as long as a peer receives at least one file block of a file, that peer will request the missing file blocks from other peers and/or the original sender.

One embodiment of the present invention includes three elements: a Primary File Block Distribution element; a File Block Location element; and File Block Request/Response element. According to the present invention, a file or buffer is stored in memory. A file block size is then chosen depending on the requirements of the system and the needs of the user. According to the present invention, a Primary File Block Distribution Message is generated and sent over a propagation mechanism, such as a propagation pipe, for each file block.

According to one embodiment of the invention, the Primary File Block Distribution Messages contain: the message type; the sender ID; a unique key identifying this file transmission; the-parent file name; the parent file size; the file block number; the total number of file blocks in the parent file; the file block size; and the file block data.

According to one embodiment of the invention, after the Primary File Block Distribution Message has been sent, the file data is kept in memory, or otherwise stored, for a predetermined period of time. Consequently, the file data is kept on hand to satisfy any file block requests from other peers. The requests are matched to the proper set of file data using the key contained in the Primary File Block Distribution Message.

According to the present invention, once a peer has received all the file blocks, that peer notifies the application of that fact, though an event, callback, or other such mechanism, well known to those of skill in the art. In addition, as noted above, according to the invention, each peer will also retain the file blocks for a predetermined period so that the file blocks can be sent to other peers that may request them.

According to the present invention, if a receiving peer fails to receive one or more of a parent file's file blocks from the primary distribution, a File Block Location element is used to determine who of the peers can supply the needed file blocks. The original sender of the file block is already known, due to the sender ID message element from the first file block that was received. However, in some embodiments of the invention, it may be desirable that the file block be supplied by other receiving peers. According to one embodiment of the invention, the task of supplying needed file blocks is shifted out to the receiving peers. According to the present invention, by shifting the task of supplying needed file blocks out to the receiving peers, the transmission load of the original sender is decreased, and the system will scale up to be able to handle larger numbers of peers.

In one embodiment of the invention, the File Block Location element is accomplished using an "Acknowledgement" or "ACK" method. Using the ACK method, each receiving peer, upon receiving a File Block Distribution Message, sends an Acknowledgement Message for that file block through the propagation mechanism. According to this embodiment of the invention, other receiving peers store the sender ID of the latest Acknowledgement Message received for each file block. According to this embodiment of the invention, if a peer determines that it is missing a file block, that peer sends a request to the peer most recently known to have received that file block. If no Acknowledgement Message has been received, the peer that is missing a file block can request the file block from the original sender. If that fails, the peer can, as a last resort, request that any peer supply the requested file block. Requesting that any peer supply the requested file block is a last resort because it may result in a deluge of responses. However, in some cases this may be the only option.

According to one embodiment of the invention, an Acknowledgement Message contains: message type to identify this as an Acknowledgement Message; sender ID for the peer sending the Acknowledgement Message; a unique key identifying this file transmission; and the file block number.

In another embodiment of the invention, the File Block Location determination is accomplished using a "Bid/Response" method. According to this embodiment of the invention, a receiving peer that is missing a file block sends out a Bid Solicitation Message for the file block. Then, according to this embodiment of the invention, any peer that has the file block will send a Bid Response Message notifying the requester that the file block is available. According to this embodiment of the invention, the receiving peer can then select one of these responding peers, and send it the file block request.

In some applications, accomplishing file block location determination using a "Bid/Response" method discussed above is advantageous over the Acknowledgement Message method discussed above because, using the "Bid/Response" method, messages are sent only when a missing file block condition arises, as opposed to the Acknowledgement Messages sent for every file block. Using the "Bid/Response" method, the message elements are identical to the Acknowledgement Message, except that the message type is used to identify the message as a Bid Solicitation Message or Bid Response Message. According to one embodiment of the invention, if no Bid Response Messages are received, the peer may request the file block from the original sender, and then from any peer, as in the ACK method.

According to the present invention, a File Block Request/Response method is used to send requests for needed file blocks to the peers identified by the File Block Location method as having the desired file block.

According to one embodiment of the present invention, the File Block Request/Response method consists of a File Block Request Message and a File Block Response Message. According to one embodiment of the present invention, the File Block Request Message contains: the message type to identify this as a File Block Request Message; the sender ID for the peer sending the File Block Request Message; a unique key identifying this file transmission; the file block number of the requested file block; and a request to peer ID for the peer to which the File Block Request Message is being made.

According to the present invention, when a peer receives a File Block Request Message, the peer sends a File Block Response Message containing: the message type to identify this as a File Block Response Message; the sender ID for the peer sending the File Block Response Message; a unique key identifying this file transmission; the file block number; and the requested file block data.

According to the present invention, the File Block Request Message and File Block Response Message may be sent through the propagation mechanism, if that is the only communication method available. According to the present invention, peers receiving File Block Request Messages check the "Request to Peer" element against their own peer ID. If the request is not addressed to them, it is ignored. Sending File Block Response Messages through the propagation mechanism may benefit other peers who also need the same file block. However, this is done at the cost of sending duplicate file blocks to any peers that have already received the file block in question.

In some embodiments of the invention, it may be more efficient to send File Block Request Messages and File Block Response Messages through a unicast "back channel" message transmission mechanism, direct from the requester to the responder and back. In addition, in one embodiment of the invention, the Bid Solicitation Messages and Bid Response Messages discussed in the file block location protocol are handled in this way. As those of skill in the art will readily recognize, to support this embodiment of the invention, a new element would be added to each of the messages described above. This new element would contain the information needed to create the "back channel" transmission to the message sender. According to this embodiment of the invention, when a peer wishes to request a file block, it opens a back channel to the destination peer, using the address information contained in an Acknowledgement Message, Bid Response Message, or Primary File Block Distribution Message. The File Block Request Message is then sent through this channel instead of through the propagation mechanism. In this embodiment of the invention, the File Block Request Message carries the "back channel" addressing needed for the File Block Reply Message.

It is to be understood that both the foregoing general description and following detailed description are intended only to exemplify and explain the invention as claimed.

BRIEF DESCRIPTION OF THE DRAWINGS

The accompanying drawings, which are incorporated in, and constitute a part of this Specification, illustrate embodiments of the invention and, together with the description, serve to explain the advantages and principles of the invention. In the drawings.

DESCRIPTION OF THE INVENTION

Figure 1:
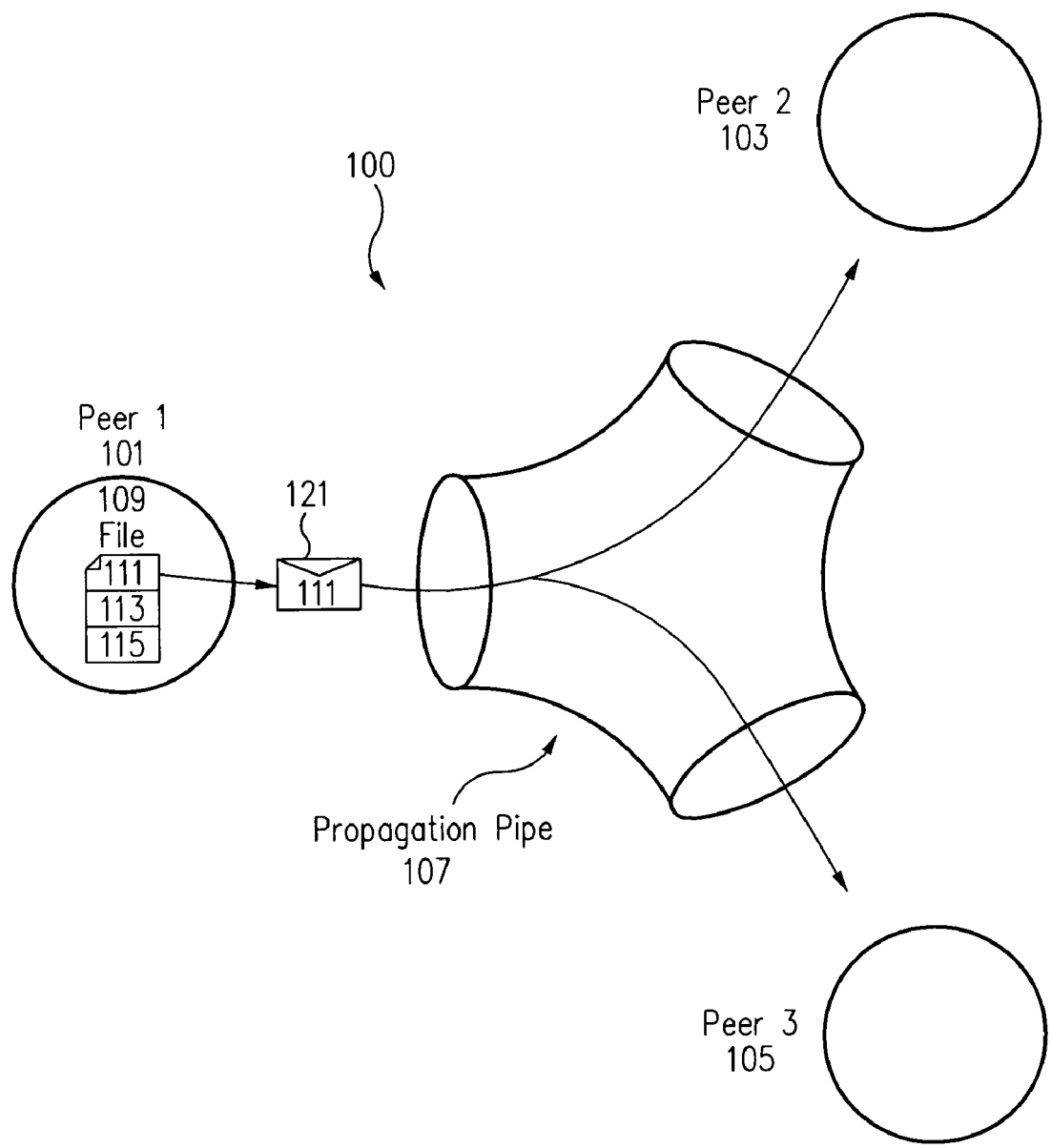
FIG. 1 shows the Primary File Block Distribution element of the binary content distribution system using propagating messages of the invention.

The invention will now be described in reference to the accompanying drawings. The same reference numbers may be used throughout the drawings and the following description to refer to the same or like parts.

The present invention provides a method and system that allows any peer (101, 103 and 105 in FIGS. 1, 2, 3, 4, and 5) to efficiently distribute content (109 in FIGS. 1, 2, 3, 4, and 5) to all other peers in a peer group using existing propagation mechanisms (107 in FIGS. 1, 2, 3, 4, and 5).

According to the present invention, binary contents (109 in FIGS. 1, 2, 3, 4, and 5), typically in files, (109 in FIGS. 1, 2, 3, 4, and 5) are broadcast over existing propagation mechanisms, such as propagation pipes, using a generic capability that can be used by any application that wants to multicast binary contents. According to the present invention, the binary contents are broken up into file blocks (111, 113 and 115 in FIGS. 1, 2, 3, 4, and 5) that are then sent over the existing propagation mechanisms. According to the present invention, the receiving peers negotiate among themselves to make up any file blocks they may have missed from the original broadcast. When each peer has all the file blocks, the peer stores the content.

In one embodiment of the invention, the peer-to-peer network (100 in FIGS. 1, 2, 3, 4, and 5) supports a "propagation" type of message transmission mechanism. In a "propagation" type of message transmission mechanism a message (121 in FIG. 1) sent by one peer (101 in FIG. 1) is delivered or "propagated", to all peers (103 and 105 in FIG. 1) within the desired set of peers ((101, 103, 105 in FIGS. 1, 2, 3, 4, and 5). As discussed below, in one embodiment of the invention, portions of the method of the invention also include a "unicast" message transmission mechanism (507 in FIG. 5), whereby a message may be sent directly from one peer to another. In one embodiment of the invention, messages support the ability to set multiple message "elements", consisting of name and value pairs.

According to the present invention, the method or "protocol" of the invention is completely asynchronous, that is to say, the method of the invention supports the simultaneous sending and receiving of multiple files and messages do not need to be received in the same order as they are sent. Of course, some messages may be dropped in transmission, and not received by one or more peers. However, according to the present invention, as long as a peer receives at least one file block of a file, that peer can, and will, request the missing file blocks from other peers and/or the original sender.

One embodiment of the present invention includes three elements: a Primary File Block Distribution element; a File Block Location element; and File Block Request/Response element. According to the present invention, a file or buffer (109 in FIGS. 1, 2, 3, 4, and 5) is stored in memory. A file block size is then chosen depending on the requirements of the system and the needs of the user. According to the present invention, a Primary File Block Distribution Message (121 in FIG. 1) is generated and sent over the propagation mechanism (107 in FIGS. 1, 2, 3, 4, and 5) for each file block (111, 113 and 115 in FIGS. 1, 2, 3, 4, and 5).

According to one embodiment of the invention, the Primary File Block Distribution Messages contain:

Message type: To identify this as a Primary File Block Distribution Message.
Sender ID: A unique ID for the sending peer.
Key: A unique key identifying this file transmission.
File name: Name for this file or data buffer.
File size: Size of the file or buffer.
File block number: The sequence number of this file block.
Total file blocks: The total number of file blocks in the file.
File block size: The size of the file block
File block data: The binary data composing this file block.

According to one embodiment of the invention, after the Primary File Block Distribution Messages have been sent, the file block data is made available to the system for a predetermined period of time. Consequently, the file block data is kept on hand to satisfy any file block requests from other peers. The requests are matched to the proper set of file block data using the key contained in the Primary File Block Distribution Message.

According to the present invention, once a peer has received all the file blocks, that peer notifies the application of that fact, though an event, callback, or other such mechanism, well known to those of skill in the art. In addition, as noted above, according to the invention, each peer will also retain the file blocks for a predetermined period so that the file blocks can be sent to other peers that may request them.

According to the present invention, if a receiving peer fails to receive one or more of a parent file's file blocks from the Primary File Block Distribution Message, a File Block Location element is used to determine who of the peers can supply the needed file blocks. The original sender of the file block is already known, due to the sender ID message element from the first file block that was received. However, in some embodiments of the invention, it may be desirable that the file block be supplied by other receiving peers. According to one embodiment of the invention, the task of supplying needed file blocks is shifted out to the receiving peers. According to the present invention, by shifting the task of supplying needed file blocks out to the receiving peers, the transmission load of the original sender is decreased, and the system will scale up to be able to handle larger numbers of peers.

Figure 2:
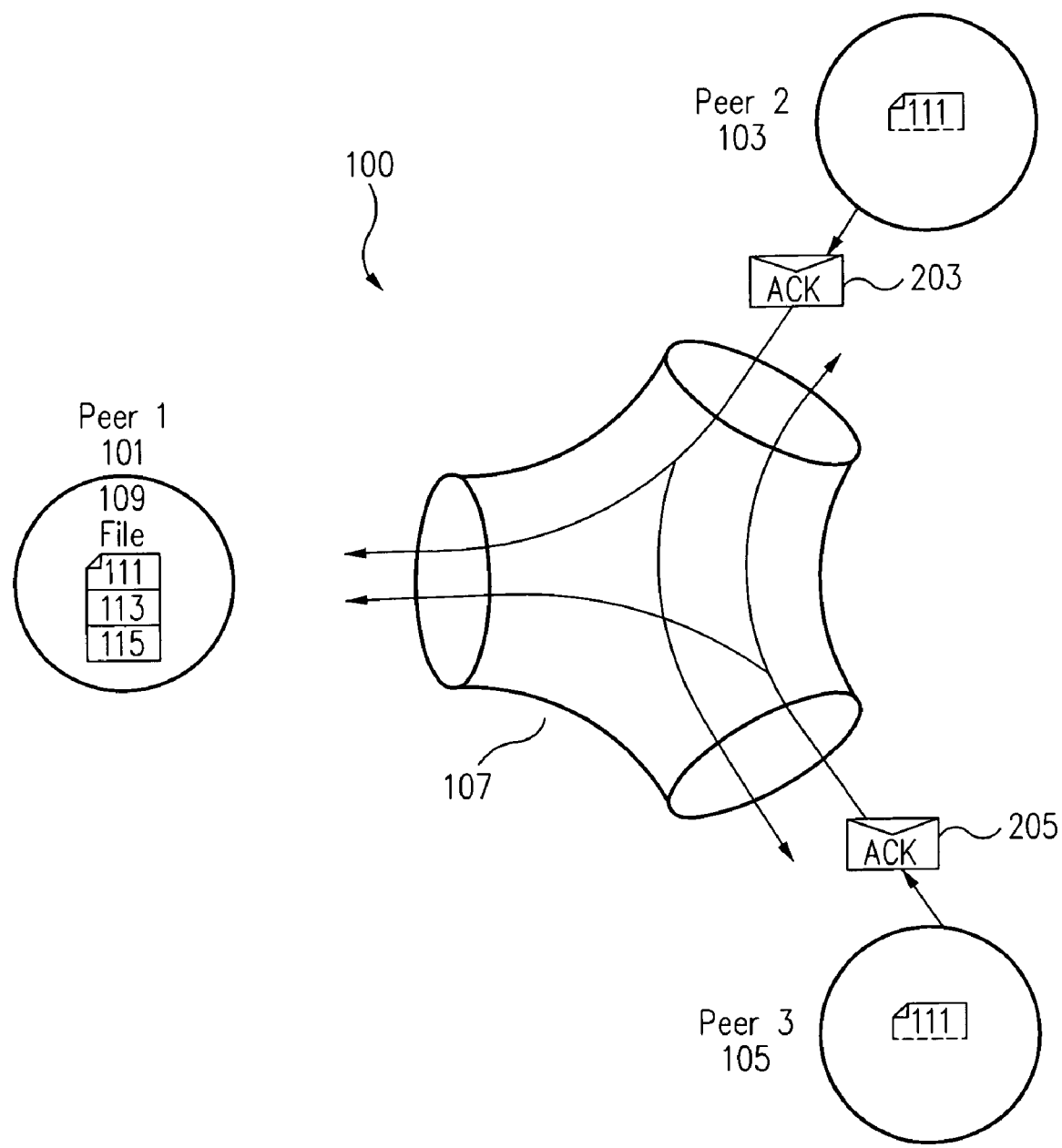
FIG. 2 illustrates one embodiment of the binary content distribution system using propagating messages of the invention in which the File Block Location element of the present invention is accomplished using the Acknowledgement method and Acknowledgement Messages.
Figure 3:
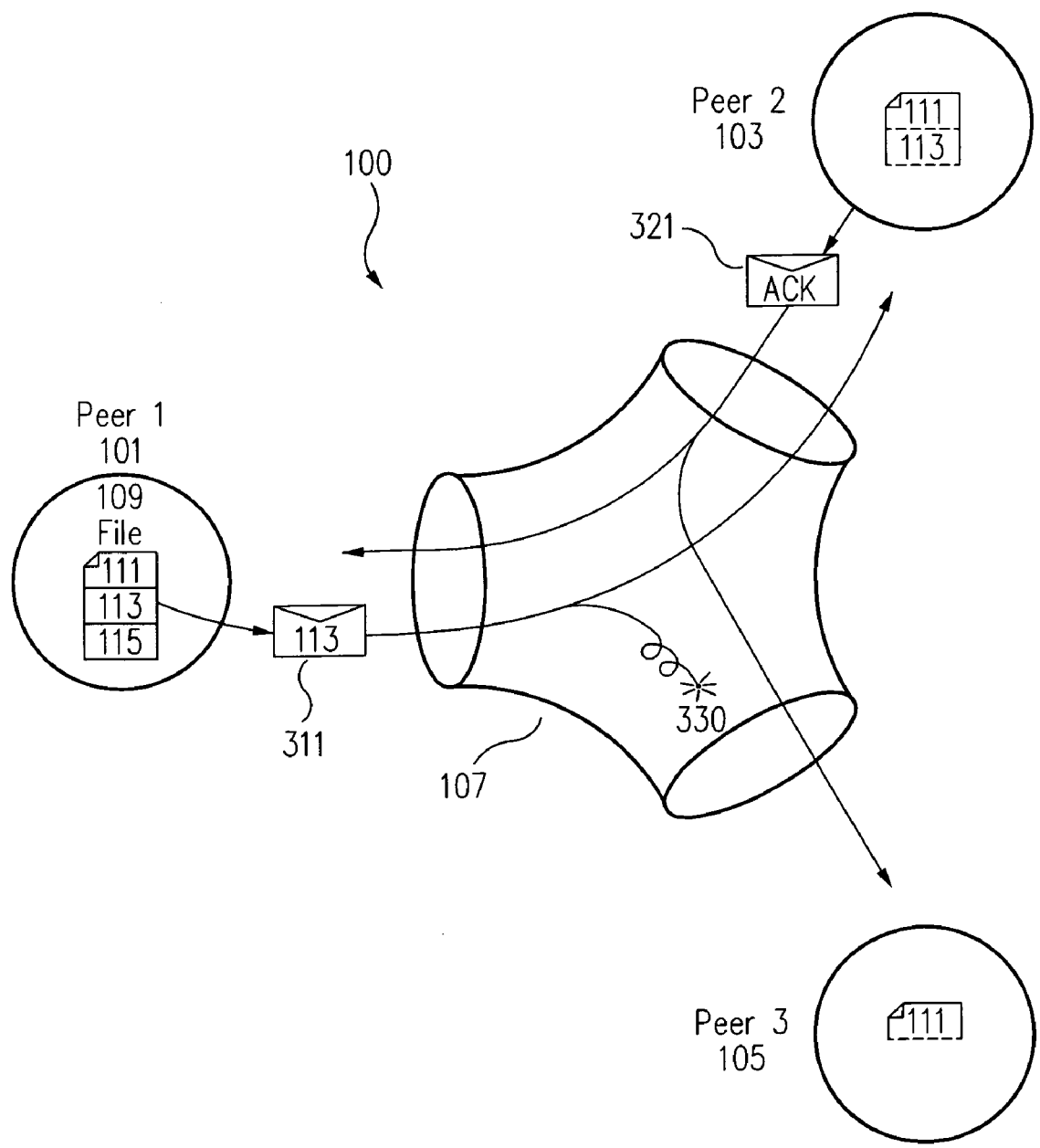
FIG. 3 illustrates one embodiment of the binary content distribution system using propagating messages of the invention in which the File Block Location element of the present invention is accomplished using the Acknowledgement method and Acknowledgement Messages and a message is dropped.

In one embodiment of the invention, the File Block Location Determination element is accomplished using an "Acknowledgement" or "ACK" method (FIGS. 2 and 3). Using the ACK method, each receiving peer (103 and 105 in FIG. 2 and FIG. 3), upon receiving a File block Distribution Message, sends an Acknowledgement Message (203 and 205 in FIG. 2 and 321 in FIG. 3) for that file block through the propagation mechanism. According to this embodiment of the invention, other receiving peers store the sender ID of the latest Acknowledgement Message received for each file block. According to this embodiment of the invention, if a peer determines that it is missing a file block, that peer sends a request to the peer most recently known to have received that file block. If no Acknowledgement Message has been received, the peer that is missing a file block can request the file block from the original sender. If that fails, the peer can, as a last resort, request that any peer supply the requested file block. Requesting that any peer supply the requested file block is a last resort because it may result in a deluge of responses. However, in some cases this may be the only option.

According to one embodiment of the invention, an Acknowledgement Message contains:

Message type: Identifies this as an Acknowledgement Message.
Sender ID: A unique ID for the peer sending the Acknowledgement Message.
Key: A unique key identifying this file transmission.
File block number: The sequence number of the received file block.

In another embodiment of the invention, the File Block Location element is accomplished using a "Bid/Response" method. According to this embodiment of the invention, a receiving peer that is missing a file block sends out a Bid Solicitation Message for the file block. Then, according to this embodiment of the invention, any peer that has the file block will send a Bid Response Message notifying the requester that the file block is available. According to this embodiment of the invention, the receiving peer can then select one of these responding peers, and send it the file block request.

In some applications, accomplishing file block location determination using a "Bid/Response" method discussed above is advantageous over the Acknowledgement Message method discussed above because, using the "Bid/Response" method, messages are sent only when a missing file block condition arises, as opposed to the Acknowledgement Messages sent for every file block. Using the "Bid/Response" method, the message elements are identical to the Acknowledgement Message, except that the message type is used to identify the message as a Bid Solicitation Message or Bid Response Message. According to one embodiment of the invention, if no Bid Response Messages are received, the peer may request the file block from the original sender, and then from any peer, as in the ACK method.

According to the present invention, a File Block Request/Response element (FIG. 4) is used to send requests for needed file blocks to the peers identified by the File Block Location element as having the desired file block.

Figure 4:
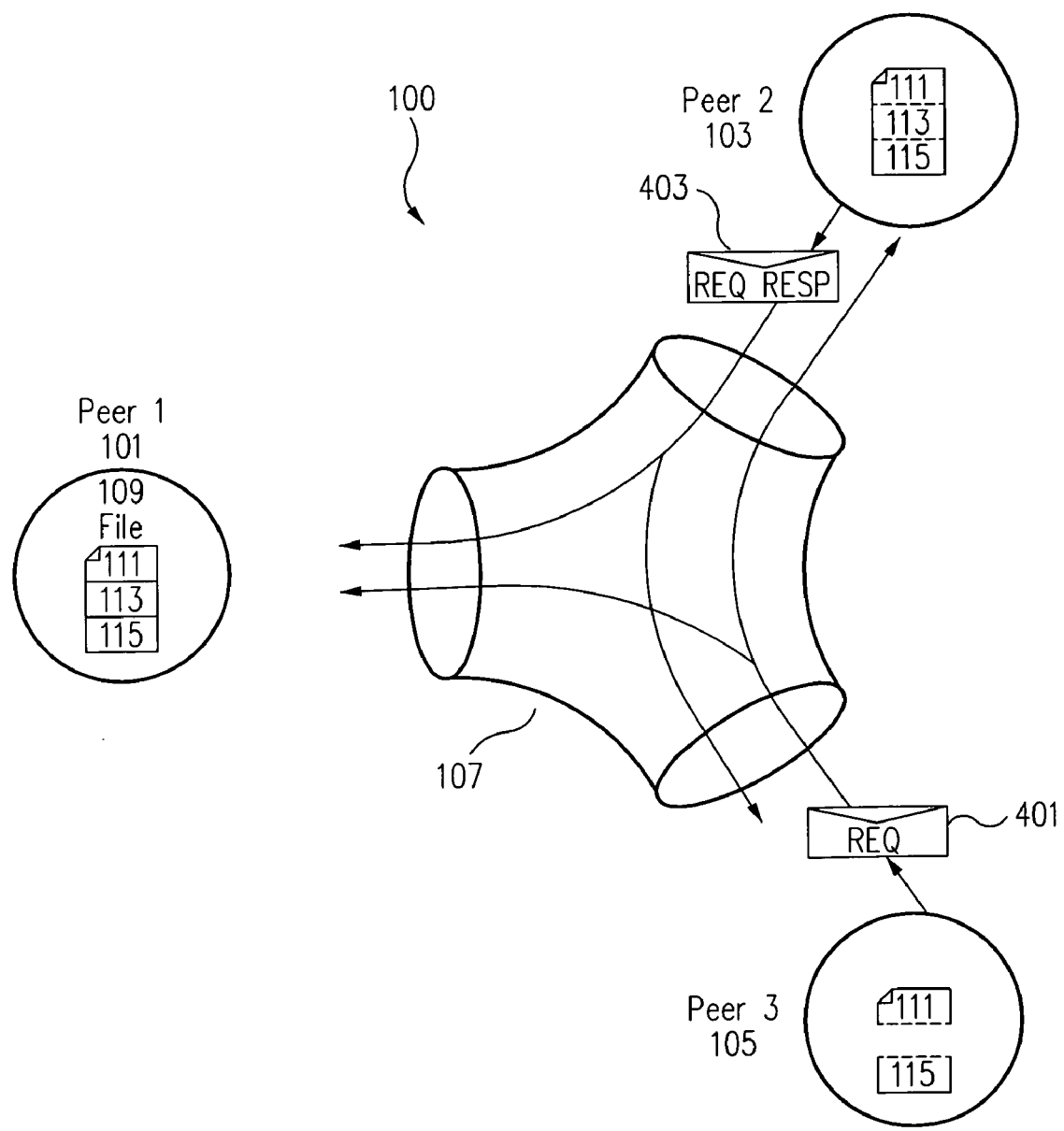
FIG. 4 illustrates one embodiment of the File Block Request/Response element of the present invention as it would be employed in the binary content distribution system using propagating messages of the invention.

According to one embodiment of the present invention, the File Block Request/Response element consists of a File Block Request Message (401 in FIG. 4) and a File Block Response Message (403 in FIG. 4). According to one embodiment of the present invention, the File Block Request Message contains:

Message type: Identifying this as a File Block Request Message.
Sender ID: A unique ID for the peer sending the request.
Key: A unique key identifying this file transmission.
File block number: The sequence number of the requested file block.
Request to peer: The ID of the peer to which the request is being made.

According to the present invention, when a peer receives a File Block Request Message, the peer sends a File Block Response Message containing:

Message type: Identifying this as a File Block Response Message.
Sender ID: A unique ID for the peer sending the File Block Response Message.
Key: A unique key identifying this file transmission.
File block number: The sequence number of the requested file block.
File block data: The requested file block's data.

According to the present invention, the File Block Request Message and File Block Response Message may be sent through the propagation mechanism, if that is the only communication method available. According to the present invention, peers receiving File Block Request Messages check the "Request to Peer" element against their own peer ID. If the request is not addressed to them, it is ignored. Sending File Block Response Messages through the propagation mechanism may benefit other peers who also need the same file block. However, this is done at the cost of sending duplicate file blocks to any peers that have already received the file block in question.

In some embodiments of the invention (FIG. 5), it may be more efficient to send File Block Request Messages and File Block Response Messages through a unicast "back channel" message transmission mechanism (507 In FIG. 5), direct from the requester (105 in FIG. 5) to the responder (103 in FIG. 5) and back. In addition, in one embodiment of the invention, the Bid Response Messages discussed in the File Block Location element are handled in this way. As those of skill in the art will readily recognize, to support this embodiment of the invention, a new element would be added to each of the messages described above. This new element would contain the information needed to create the "back channel" transmission to the message sender. According to this embodiment of the invention, when a peer wishes to request a file block, it opens a back channel to the destination peer, using the address information contained in an Acknowledgement Message, Bid Response Message, or Primary Distribution File Block Message. The File Block Request Message is then sent through this channel instead of through the propagation mechanism. In this embodiment of the invention, the File Block Request Message carries the back channel addressing needed for the File Block Response Message.

FIG. 1 shows a Primary File Block Distribution element 100 according to the principles of the present invention. As shown in FIG. 1, Primary File Block Distribution element 100 includes three peers: peer 101; peer 103; and peer 105. Peer 101, peer 103 and peer 105 are all connected by propagation mechanism 107, or propagation pipe 107. Those of skill in the art will readily recognize that only three peers 101, 103 and 105 are shown in the FIGS. 1, 2, 3, 4 and 5 to simplify illustration of the invention. In actual implementation, it is anticipated that the actual number of peers, like peers 101, 103 and 105, would vary from as few as two to hundreds, thousands, hundred of thousands or even millions. Consequently, the invention is certainly not limited to use with the three peers 101, 103 and 105 shown in the FIGS. 1, 2, 3, 4 and 5 and discussed below.

According to the present invention, a file 109, or buffer 109, is stored in memory (not shown). File 109 is then divided into file blocks 111, 113 and 115. The size and number of file blocks 111, 113 and 115 is chosen depending on the requirements of the system and the needs of the user and can be defined as needed.

According to the present invention, a Primary File Block Distribution Message, such as Primary File Block Distribution Message 121, is generated for each file block 111, 113, 115 and sent over propagation mechanism 107. According to one embodiment of the invention, Primary File Block Distribution Messages, such as Primary File Block Distribution Message 121, contain the following elements:

Message type: To identify this as a Primary File Block Distribution Message 121.
Sender ID: A unique ID for the sending peer.
Key: A unique key identifying this file transmission.
File name: Name for this file or data buffer.
File size: Size of the file or buffer.
File block number: The sequence number of this file block.
Total file blocks: The total number of file blocks in the file.
File block size: The size of the file blocks 111, 113 or 115.
File block data: The binary data composing this file block.

According to one embodiment of the invention, after the Primary File Block Distribution Messages, such as Primary File Block Distribution Message 121, have been sent, the file block 111, 113 115 data is kept in memory (not shown), or otherwise stored, at all three peers 101, 103 and 105 for a predetermined period of time. Consequently, the file block 111, 113, 115 data is kept on hand to satisfy any File Block Request Messages from other peers, such as peers 101, 103, 105 (see FIG. 4 and the discussion below). As discussed in more detail below, the File Block Request Messages are matched to the proper set of file block 111, 113, 115 data using the key contained in the Primary File Block Distribution Message, such as Primary File Block Distribution Message 121.

According to the present invention, once a peer 101, 103 or 105 has received all the file blocks 111, 113 and 115 for a given file 109, it notifies the application of that fact, though an event, callback, or other such mechanism, well known to those of skill in the art. In addition, as noted above, according to the invention, each peer 101, 103 105 will also retain the file blocks 111, 113 and 115 for a predetermined period so that file blocks 111, 113 and 115 can be sent to other peers 101, 103, 105 that may request them.

In one embodiment of the invention, the File Block Location element of the invention is accomplished using an "Acknowledgement" or "ACK" method. FIG. 2 and FIG. 3 illustrate one embodiment of the invention in which the File Block Location element of the present invention is accomplished using the ACK method and Acknowledgement Messages 203, 205, 321. Using the ACK method, each receiving peer 103 and 105, upon receiving a File Block Distribution Message (121 in FIG. 1) containing file block 111 from sending peer 101, sends an Acknowledgement Message 203 and 205, respectively, for file block 111 through propagation mechanism 107 to all peers 101, 103, 105. According to this embodiment of the invention, other receiving peers 103, 105 store the sender ID of the latest Acknowledgement Message 203, 205 received for each file block 111, 113, 115. According to one embodiment of the invention, an Acknowledgement Message 203, 205, 321 contains the following elements:

Message type: Identifies this as an Acknowledgement Message 203, 205, 321.
Sender ID: A unique ID for the peer sending the Acknowledgement Message 203, 205, 321.
Key: A unique key identifying this file transmission.
File block number: The sequence number of the received file block 111, 113 or 115.

As further illustrated in FIG. 3, in embodiments of the invention employing the "Acknowledgement" or "ACK" method of the File Block Location element of the invention, if a peer 101, 103, 105 determines that it is missing a file block 111, 113 or 115, that peer 101, 103 or 105 sends a request (FIG. 4) to the peers 101, 103 or 105 most recently known to have received that file block 111, 113 or 115.

In the Example shown in FIG. 3, peer 101 sends Primary File Block Distribution Message 311 containing file block 113 to peers 103 and 105. Peer 103 receives Primary File Block Distribution Message 311 containing file block 113 and then, according to this embodiment of the invention, Acknowledgement Message 321 is sent by peer 103 to both sending peer 101 and fellow receiving peer 105. As also illustrated in FIG. 3, in this example, Primary File Block Distribution Message 311 containing file block 113 is dropped at point 330, prior to reaching peer 105. Consequently, peer 105, unlike peer 103, fails to receive Primary File Block Distribution Message 311 containing file block 113 and, therefore, does not generate an Acknowledgement Message. However, since peer 105 does receive Acknowledgement Message 321 from peer 103, peer 105 can request file block 113 from peer 103.

In the event that no Acknowledgement Message 321 from peer 103, or any Acknowledgement Messages from other peers in Primary File Block Distribution element 100 is received by peer 105, then peer 105 can request file block 113 from the original sender, i.e., peer 101. If that fails, peer 105 can, as a last resort, request that any peer 101, 103, etc. in Primary File Block Distribution element 100 supply file block 113. Requesting that any peer supply the requested file block is a last resort because it may result in a deluge of responses. However, in some cases this may be the only option In another embodiment of the invention (not shown), the File Block Location element of the present invention is accomplished using a "Bid/Response" method. According to this embodiment of the invention, a receiving peer that is missing a file block sends out a Bid Solicitation Message for the missing file block. Then, according to this embodiment of the invention, any peer that has the missing file block will send a Bid Response Message notifying the requester that the missing file block is available. According to this embodiment of the invention, the receiving peer can then select one of these responding peers, and send it the File Block Request Message.

In some applications, accomplishing file block location determination using a "Bid/Response" method discussed above is advantageous over the ACK method discussed above, and shown in FIGS. 2 and 3, because, using the "Bid/Response" method, messages are sent only when a missing file block condition arises, as opposed to the Acknowledgement Messages sent for every file block according to the ACK method of FIGS. 2 and 3 discussed above. Using the "Bid/Response" method, the Bid Solicitation Message and Bid Response Message elements are identical to the Acknowledgement Message, except that the message type is used to identify the message as a Bid Solicitation Message or Bid Response Message. According to one embodiment of the invention, if no Bid Response Messages are received, the peer may request the file block from the original sender, and then from any peer, as in the ACK method discussed above.

According to the present invention, a File Block Request/Response element is used to send requests for needed file blocks to the peers identified by the File Block Location element as having the desired file block. According to one embodiment of the present invention, the File Block Request/Response element of the invention consists of a File Block Request Message and a File Block Response Message.

FIG. 4 illustrates one embodiment of the File Block Request/Response element of the present invention as it would be employed in the Primary File Block Distribution element 100 of FIG. 1. As shown in FIG. 4, file blocks 111, 113 and 115 have been sent by peer 101 to peers 103 and 105. Peer 103 has received all three file blocks 111, 113 and 115. However, peer 105 has only received file blocks 111 and 115 and is missing file block 113. According to the present invention, and as discussed above, peer 105 has received an Acknowledgement Message (See FIG. 3) from peer 103 indicating peer 103 is in possession of file block 113. Consequently, according to one embodiment of the invention, peer 105 sends a File Block Request Message 401 into distribution mechanism 107 requesting file block 113 and specifying that File Block Request Message 401 is for peer 103, typically the peer to last receive file block 113 or the closest or most available peer. Peer 103 then sends a File Block Response Message 403, containing file block 113, back into distribution mechanism 107 and to peer 105.

According to one embodiment of the present invention, a File Block Request Message, such as File Block Request Message 401 in FIG. 4, contains the following elements:

Message type: Identifying this as a File Block Request Message 401.
Sender ID: A unique ID for the peer sending the request.
Key: A unique key identifying this file transmission.

File block number: The sequence number of the requested file block.

Request to peer: The ID of the peer to which the request is being made.

As discussed above, when a peer receives a File Block Request Message 401, it sends a File Block Response Message 403 containing the requested file block. According to one embodiment of the present invention, a File Block Response Message 403, contains the following elements:

Message type: Identify this as a File Block Response Message 403.

Sender ID: A unique ID for the peer sending the response.

Key: A unique key identifying this file transmission.

File block number: The sequence number of the requested file block.

File block data: The requested file block's data.

According to the present invention, File Block Request Messages 401 and File Block Response Messages 403 may be sent through propagation mechanism 107, if that is the only communication method available. According to the present invention, peers 101, 103 or 105 receiving File Block Request Messages 401 check the "Request to Peer" element of the File Block Request Message 401 against their own peer ID. If the File Block Request Message 401 is not addressed to them, it is ignored. Sending File Block Response Messages 403 through propagation mechanism 107 may benefit other peers 101, 103 or 105 who also need the same file block 111, 113 or 115. However, this is done at the cost of sending duplicate file blocks 111, 113, or 115 to any peers 101, 103 or 105 that have already received the file block 101, 103, 105 in question.

In some embodiments of the invention, it may be more efficient to send File Block Request Messages and File Block Response Messages through a unicast "back channel" message transmission mechanism, direct from the requester to the responder and back. A unicast "back channel" message transmission mechanism 507 is shown in FIG. 5 as it would be employed in the Primary File Block Distribution element 100 of FIGS. 1, 2, 3, and 4.

Figure 5:
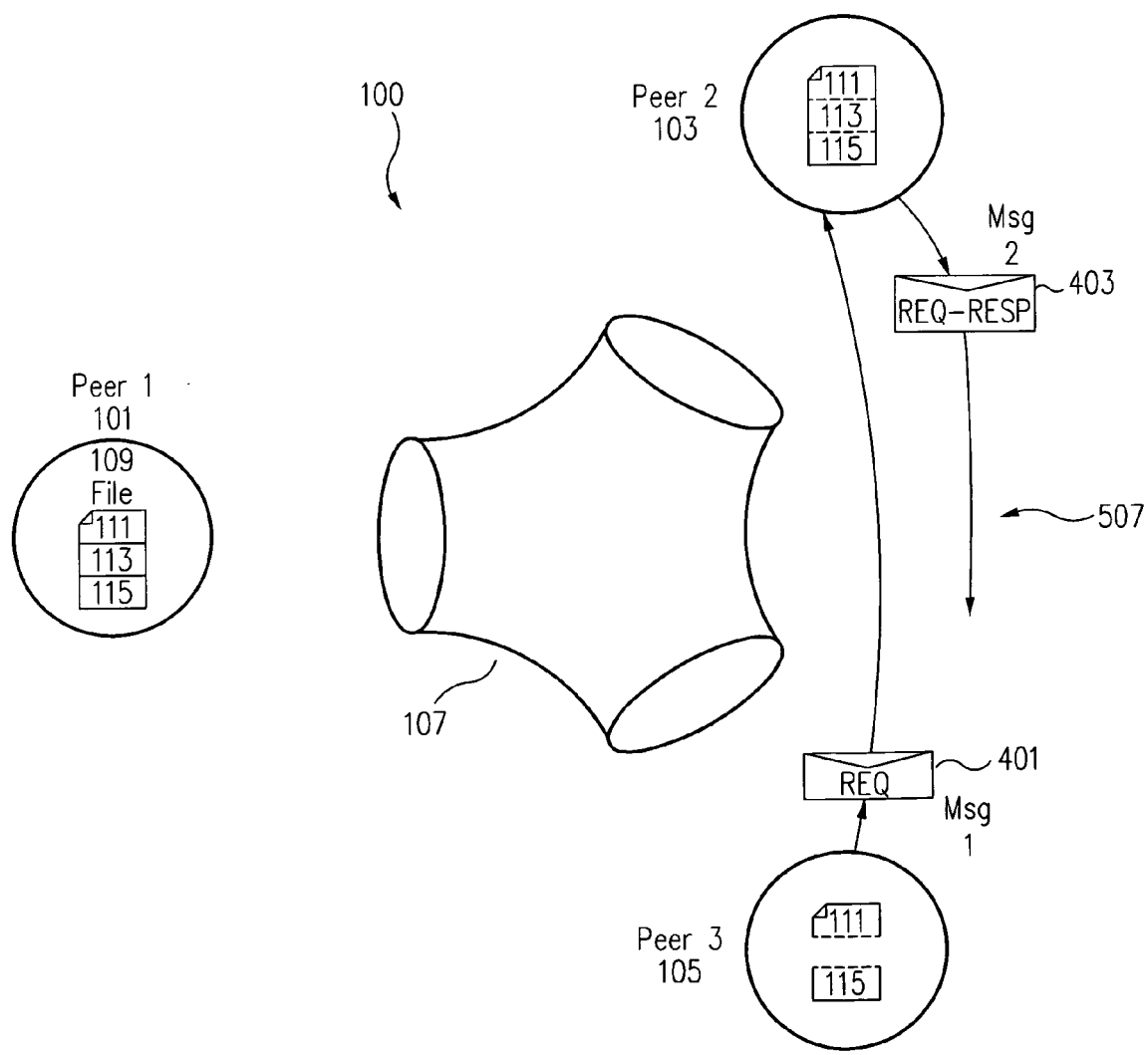
FIG. 5 shows a unicast "back channel" message transmission mechanism as it would be employed in the binary content distribution system of the invention.

As shown in FIG. 5, file blocks 111, 113 and 115 have been sent by peer 101 to peers 103 and 105. Peer 103 has received all three file blocks 111, 113 and 115. However, peer 105 has only received file blocks 111 and 115 and is missing file block 113. According to this embodiment of the present invention, and as discussed above, peer 105 has received an Acknowledgement Message (see FIG. 3) from peer 103 indicating peer 103 is in possession of file block 113. According to this embodiment of the invention, peer 105 sends a File Block Request Message 401 requesting file block 113, not through distribution mechanism 107, but instead through unicast "back channel" 507 directly to peer 103. Peer 103 then sends a File Block Response Message 403, containing file block 113, back to peer 105 directly through unicast "back channel" 507.

In one embodiment of the invention, the Bid Solicitation Messages and Bid Response Messages discussed above in the File Block Location element are also handled in this way. As those of skill in the art will readily recognize, to support this embodiment of the invention, a new element (not shown) would be added to each of the File Block Request Messages and File Block Response Messages described above. This new element (not shown) would contain the information needed to create the "back channel" 507 to the message sender. According to this embodiment of the invention, when a peer 101, 103, 105 wishes to request a file block 111, 113 or 115, it opens a back channel 507 to the destination peer 101, 103 or 105, using the address information contained in the Acknowledgement Message 203, 205 in FIG. 2, 321 In FIG. 3, Bid Response Message (not shown), or Primary File Block Distribution Message 121 in FIG. 1. Returning to FIG. 5, the File Block Request Message 401 is then sent through back channel 507 instead of through propagation mechanism 107. The File Block Request Message 401 carries the back channel 507 addressing needed for the file block request reply message 403.

FIGS. 6A, 6B, 6C and 6D illustrate a flow chart for one embodiment of a binary content distribution method using propagating messages 600 according to the principles of the present invention. Viewing FIGS. 1, 3, 3, 4, 5 and 6A, 6B, 6C, 6D together, the process begins at start 601 in FIG. 6A.

Figure 6A:
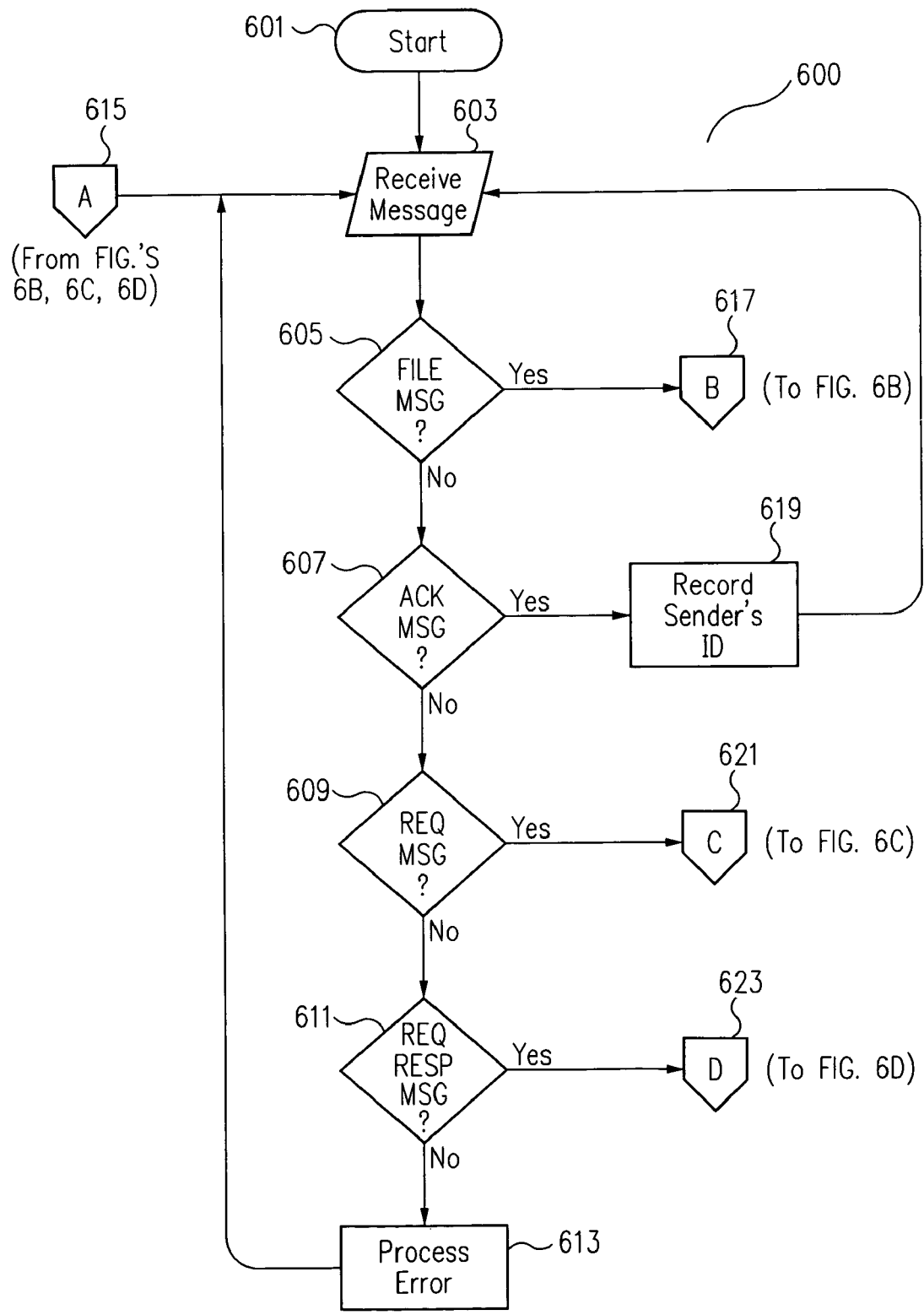
FIG. 6A shows a portion of a flow chart for one embodiment of a binary content distribution method using propagating messages designed according to the principles of the present invention.

At operation 603 in FIG. 6A, a message is received by a given peer 101, 103 or 105 in FIG. 1. Returning to FIG. 6A, at operation 605, a determination is made as to whether the message received at operation 603 is a Primary File Block Distribution Message, such as Primary File Block Distribution Message 121 in FIG. 1. As shown in FIG. 6A, if the received message is a Primary File Block Distribution Message, then method 600 proceeds to process "B" 617 and FIG. 6B (discussed below). As also shown in FIG. 6A, if the received message is not a Primary File Block Distribution Message, then method 600 proceeds to operation 607.

At operation 607, a determination is made as to whether the message received at operation 603 is an Acknowledgement Message, such as Acknowledgement Messages 203 or 205 in FIG. 2. As shown in FIG. 6A, if the message received at operation 603 is an Acknowledgement Message then method 600 proceeds to operation 619 where the peer ID (not shown) for the peer sending the Acknowledgement Message is stored so that the file block being acknowledged can be requested from the peer sending the Acknowledgement Message, if needed. If the message received at operation 603 is not an Acknowledgement Message, then method 600 proceeds to operation 609.

At operation 609, a determination is made as to whether the message received at operation 603 is a File Block Request Message, such as File Block Request Message 401 in FIG. 4. If the message received at operation 603 is a File Block Request Message, then method 600 proceeds to process "C" 621 and FIG. 6C (discussed below). As also shown in FIG. 6A, if the message received at operation 603 is not a File Block Request Message, then method 600 proceeds to operation 611.

At operation 611, a determination is made as to whether the message received at operation 603 is a File Block Response Message, such as File Block Response Message 403 in FIG. 4. If the message received at operation 603 is a File Block Response Message, then method 600 proceeds to process "D" 623 and FIG. 6D (discussed below). As also shown in FIG. 6A, if the message received at operation 603 is not a File Block Response Message, then method 600 proceeds to operation 613.

Operation 613 is a process error operation that indicates the message received at operation 603 is of an unknown type and can therefore be ignored and method 600 returns to operation 603.

Figure 6B:
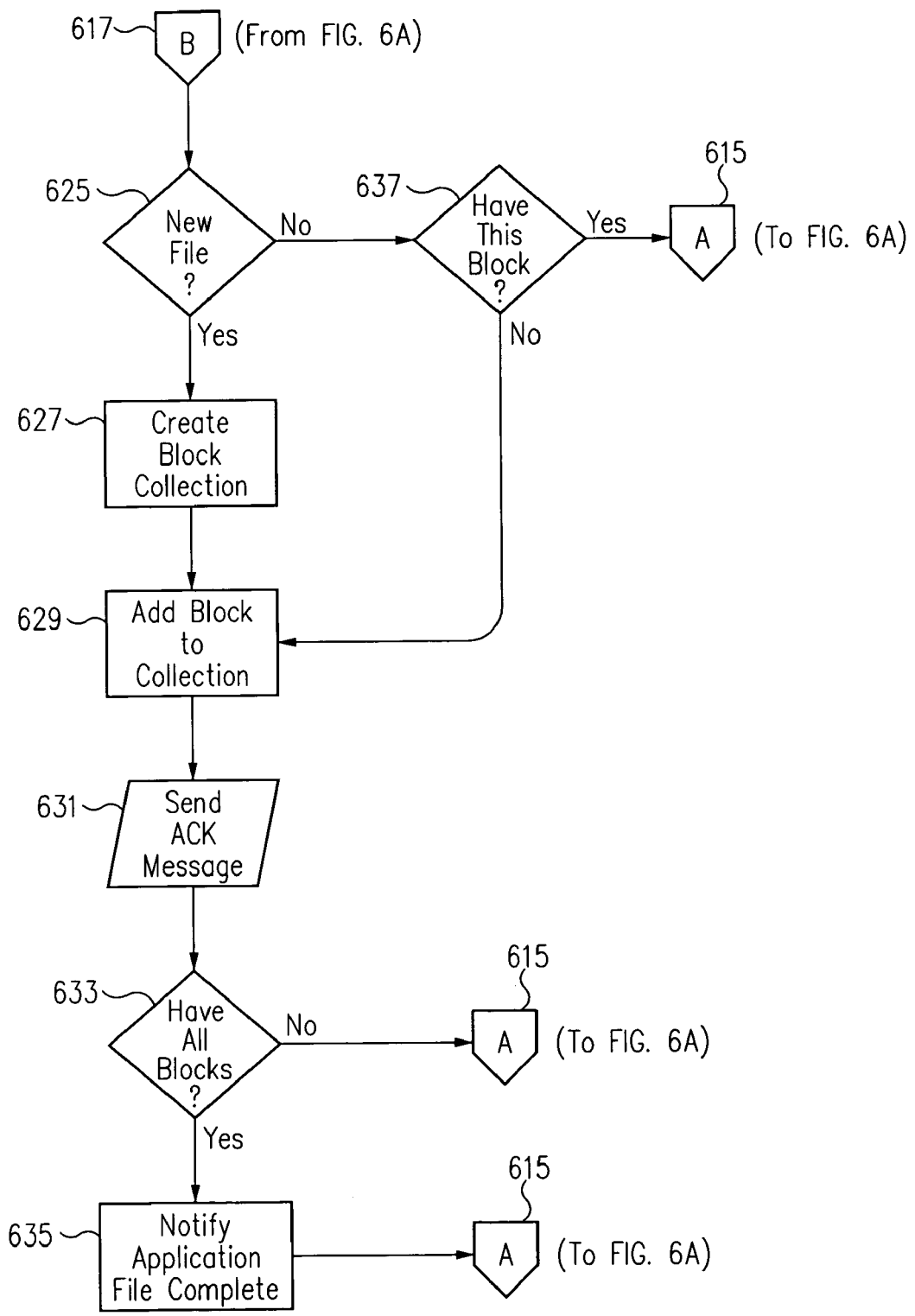
FIG. 6B shows a portion of a flow chart for one embodiment of a binary content distribution method using propagating messages designed according to the principles of the present invention.

Returning to FIG. 6A, as noted above, at operation 605 a determination is made as to whether the message received at operation 603 is a Primary File Block Distribution Message, such as Primary File Block Distribution Message 121 in FIG. 1. As also noted above, if the message received at operation 603 is a Primary File Block Distribution Message, then method 600 proceeds to process "B" 617 and FIG. 6B. Referring now to FIG. 6B, if the message received at operation 603 is a Primary File Block Distribution Message, method 600 proceeds to operation 625. At operation 625, a determination is made as to whether the present Primary File Block Distribution Message includes the first file block, such as file blocks 111, 113 or 115, for the parent file, such as file 109 in FIG. 1. Returning to FIG. 6B, if the present Primary File Block Distribution Message does not include the first file block for the parent file, i.e., the present peer already has either this file block or other file blocks of the parent file, then method 600 proceeds to operation 637. At operation 637, a determination is made as to whether the present peer has this particular file block, such as file blocks 111, 113 or 115 in FIG. 1. As seen in FIG. 6B, if it is determined that the present peer has this file block, then method 600 returns to point "A" 615 and FIG. 6A discussed above. However, if it is determined that the present peer does not already have this file block, then method 600 proceeds to operation 629 (discussed below).

As noted above, at operation 625 a determination is made as to whether the present Primary File Block Distribution Message includes the first file block, such as file blocks 111, 113 or 115, for the parent file, such as file 109 in FIG. 1. If the present Primary File Block Distribution Message does include the first file block for the parent file, i.e., the present peer has neither this file block nor other file blocks of the parent file, then method 600 proceeds to operation 627.

At operation 627, an area is created/designated to store and assemble the file blocks for this parent file. Method 600 then proceeds to operation 629.

As noted above, if at operation 637, a determination is made that the present peer does not already have this file block, or if at operation 627 an area is now created to store and assemble the file blocks for a new parent file, then method 600 proceeds to operation 629. At operation 629, the present file block is stored along with any other file blocks belonging to the same parent file. Method 600 then proceeds to operation 631.

At operation 631, an Acknowledgement Message, such as Acknowledgement Messages 203 and 205 in FIG. 2, is generated and sent into the propagation mechanism, such as propagation mechanism 107 in FIG. 1. As seen in FIG. 6B, method 600 then proceeds to operation 633.

At operation 633, a determination is made as to whether the present peer has all the file blocks associated with the present parent file. If it is determined that the present peer does not have all the file blocks associated with the present parent file, then method 600 returns to point "A" 615 and FIG. 6A discussed above. If it is determined that the present peer does have all the file blocks associated with the present parent file, then method 600 proceeds to operation 635.

At operation 635, a notice is generated that the parent file is now complete and is ready for use. Method 600 then returns to point "A" 615 and FIG. 6A discussed above.

Figure 6C:
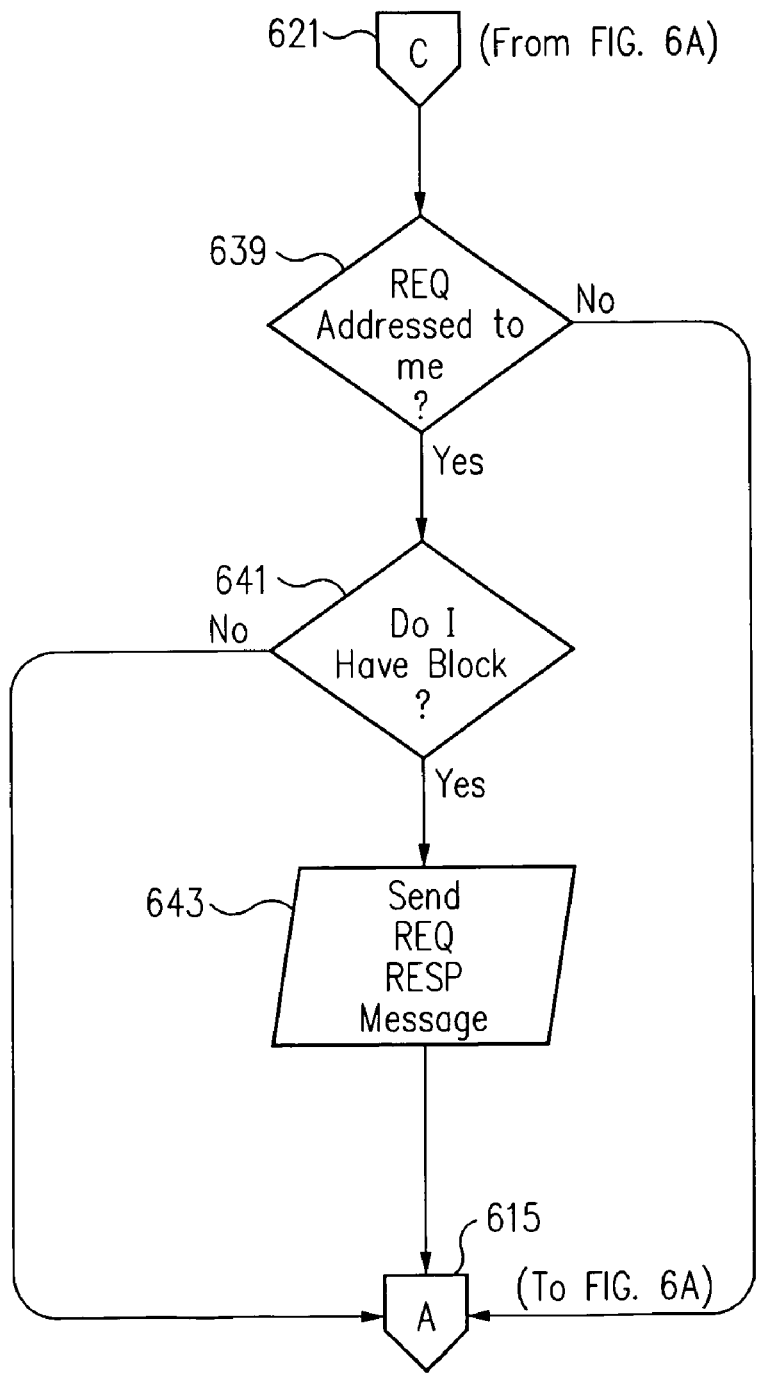
FIG. 6C shows a portion of a flow chart for one embodiment of a binary content distribution method using propagating messages designed according to the principles of the present invention.

Returning to FIG. 6A, as noted above, at operation 609 a determination is made as to whether the message received at operation 603 is a File Block Request Message, such as File Block Request Message 401 in FIG. 4. If the message received at operation 603 is a File Block Request Message, then method 600 proceeds to process "C" 621 and FIG. 6C. Referring now to FIG. 6C, if the message received at operation 603 is a File Block Request Message then method 600 proceeds to operation 639. At operation 639, a determination is made as to whether the File Block Request Message is addressed to the present peer. If it is determined that the File Block Request Message is not addressed to the present peer, then method 600 returns to point "A" 615 and FIG. 6A discussed above. If it is determined that the File Block Request Message is addressed to the present peer, then method 600 proceeds to operation 641.

At operation 641, a determination is made as to whether or not the present peer has the requested file block. If the present peer does not have the requested file block, then method 600 returns to point "A" 615 and FIG. 6A discussed above. If the present peer does have the requested file block, then method 600 proceeds to operation 643.

At operation 643, the present peer sends the requested block, in a message such as File Block Response Message 403 in FIG. 4, through the propagation mechanism, such as propagation mechanism 107 in FIG. 1, to the requesting peer. Method 600 then returns to point "A" 615 and FIG. 6A discussed above.

Figure 6D:
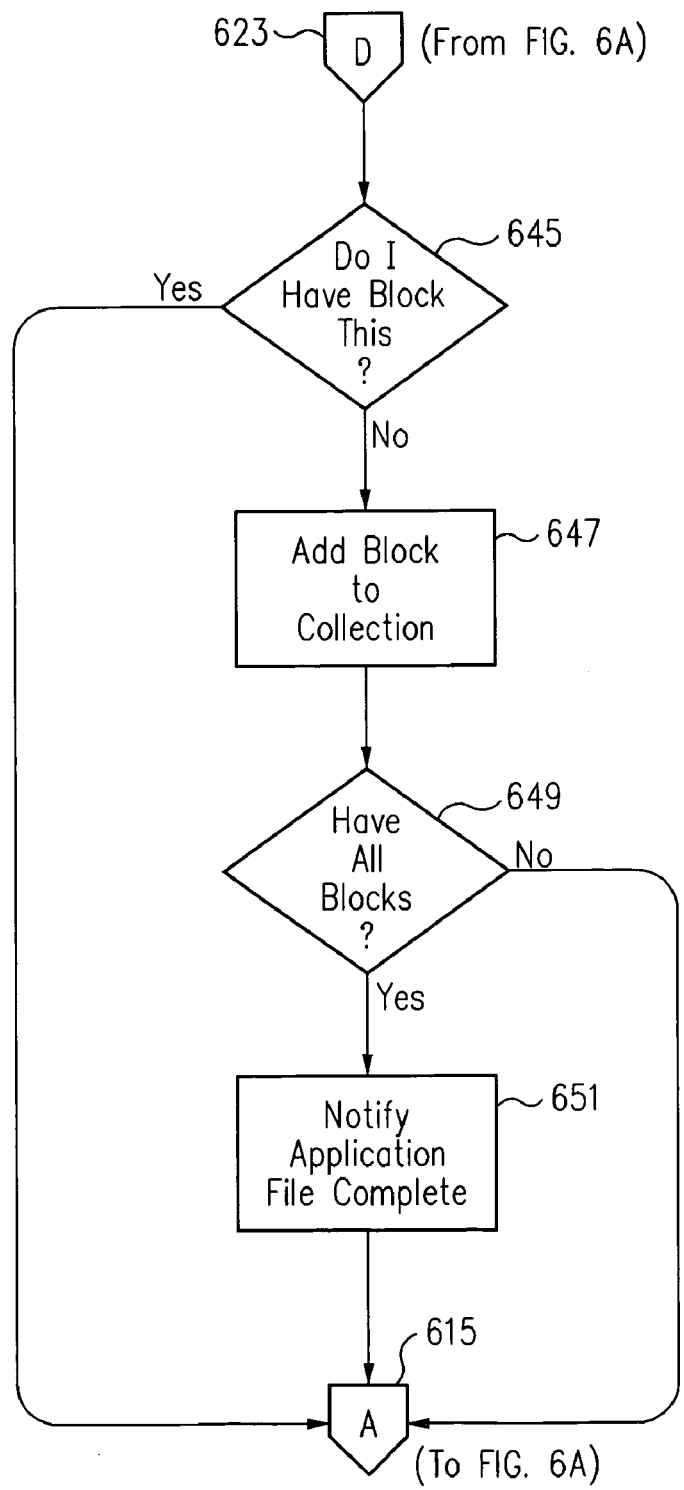
FIG. 6D shows a portion of a flow chart for one embodiment of a binary content distribution method using propagating messages designed according to the principles of the present invention.

Returning to FIG. 6A, as noted above, at operation 611, a determination is made as to whether the message received at operation 603 is a File Block Response Message, such as File Block Response Message 403 in FIG. 4. If the message received at operation 603 is a File Block Response Message, then method 600 proceeds to process "D" 623 and FIG. 6D. Referring now to FIG. 6D, if the message received at operation 603 is a File Block Response Message, then method 600 proceeds to operation 645.

At operation 645, a determination is made as to whether or not the present peer already has the delivered file block. If the present peer does have the delivered file block, then method 600 returns to point "A" 615 and FIG. 6A discussed above. If the present peer does not already have the delivered file block, then method 600 proceeds to operation 647.

At operation 647, the delivered file block is stored with all other file blocks for the present parent file and method 600 proceeds to operation 649.

At operation 649, a determination is made as to whether the present peer has all of the blocks associated with the parent file. If it is determined that the present peer does not have all of the blocks associated with the parent file, then method 600 returns to point "A" 615 and FIG. 6A discussed above. If it is determined that the present peer does have all of the blocks associated with the parent file, then method 600 proceeds to operation 651.

At operation 651, a notice is generated that the parent file is now complete and is ready for use. Method 600 then returns to point "A" 615 and FIG. 6A discussed above.

The foregoing description of an implementation of the invention has been presented for purposes of illustration and description only, and therefore is not exhaustive and does not limit the invention to the precise form disclosed. Modifications and variations are possible in light of the above teachings or may be acquired from practicing the invention.

For example, for illustrative purposes specific embodiments of the invention were shown with a specific sequence of events. However, those of skill in the art will readily recognize that the specific sequence of events shown in the FIG.s, and described above, are for illustrative purposes only and that the sequence of events shown can be modified to meet the needs of the user without departing from the spirit and scope of the invention.

In addition, those of skill in the art will readily recognize that only three peers 101, 103 and 105 are shown in the FIGS. 1, 2, 3, 4 and 5 to simplify illustration of the invention. In actual implementation, it is anticipated that the actual number of peers, like peers 101, 103 and 105, would vary from as few as two to hundreds, thousands, hundred of thousands or even millions. Consequently, the invention is certainly not limited to use with the three peers 101, 103 and 105 shown in the FIGS. 1, 2, 3, 4 and 5 and discussed below.

Consequently, the scope of the invention is defined by the claims and their equivalents.

What is claimed is:

1. a binary content distribution method using propagating messages comprising:

providing a propagation mechanism;

connecting at least two peers to said propagation mechanism;

distributing messages to said at least two peers through said propagation mechanism;

a first peer of said at least two peers receiving a first message through said propagation mechanism from a second peer of said at least two peers;

determining if said first message is a Primary File Block Distribution Message;

if said first message is not a Primary File Block Distribution Message, determining if said first message is an Acknowledgement Message;

if said first message is an Acknowledgement Message storing a peer ID for said second peer at said first peer;

if said first message is not an Acknowledgement Message, determining if said first message is a File Block Request Message;

if said first message is not a File Block Request Message, determining if said first message is a File Block Response Message;

if said first message is not a File Block Response Message, labeling said first message as an unknown message type;

if said first message is a Primary File Block Distribution Message, determining if a file block portion of said Primary File Block Distribution Message is part of a new file for said first peer;

if said file block portion of said Primary File Block Distribution Message is part of a new file for said first peer, designating memory space at said first peer for said new file and storing said file block portion of said Primary File Block Distribution Message at said first peer and then sending an Acknowledgement Message to all other peers of said at least two peers;

if said file block portion of said Primary File Block Distribution Message is not part of a new file for said first peer, determining if said first peer has already received said file block portion of said Primary File Block Distribution Message;

if said first peer has not already received said file block portion of said Primary File Block Distribution Message, storing said file block portion of said Primary File Block Distribution Message at said first peer and then sending an Acknowledgement Message to all other peers of said at least two peers;

if said first message is a Primary File Block Distribution Message and said file block portion of said Primary File Block Distribution Message is stored at said first peer, determining if said file block portion of said Primary File Block Distribution Message completes a parent file;

if said file block portion of said Primary File Block Distribution Message completes said parent file, generating a notice that said parent file is now complete and is ready for use;

if said first message is a File Block Request Message, determining if said File Block Request Message is addressed to said first peer;

if said File Block Request Message is addressed to said first peer, determining if said first peer has said file block being requested by said File Block Request Message;

if said first peer has said file block being requested by said File Block Request Message, said first peer sending said file block being requested by said File Block Request Message to said second peer;

if said first message is a File Block Response Message, determining if said first peer already has a file block being delivered in said File Block Response Message;

if said first peer does not already have said file block being delivered in said File Block Response Message, storing said file block being delivered in said File Block Response Message at said first peer; and if said file block portion of said File Block Response Message completes a parent file, generating a notice that said parent file is now complete and is ready for use.

2. The binary content distribution system using propagating messages of claim 1, wherein;

said File Block Request Message and said File Block Response Message are sent through said propagation mechanism.

3. The binary content distribution system using propagating messages of claim 1, wherein;

said File Block Request Message and said File Block Response Message are sent through a unicast back channel.

* * * * *